(12) United States Patent
McDowall et al.

(10) Patent No.: US 8,223,197 B2
(45) Date of Patent: Jul. 17, 2012

(54) MULTI-PERSON STEREO DISPLAY SYSTEM

(75) Inventors: Ian McDowall, Palo Alto, CA (US); Mark Bolas, Mountain View, CA (US)

(73) Assignee: Fakespace Labs, Inc., Mountain View, CA (US)

( * ) Notice: Subject to any disclaimer, the term of this patent is extended or adjusted under 35 U.S.C. 154(b) by 454 days.

(21) Appl. No.: 12/411,238

(22) Filed: Mar. 25, 2009

(65) Prior Publication Data

US 2009/0185030 A1     Jul. 23, 2009

Related U.S. Application Data

(63) Continuation of application No. 11/196,010, filed on Aug. 2, 2005, now abandoned, which is a continuation of application No. 10/392,481, filed on Mar. 18, 2003, now Pat. No. 6,924,833, which is a continuation of application No. 08/748,595, filed on Nov. 13, 1996, now Pat. No. 6,535,241.

(51) Int. Cl.
*H04N 7/18* (2006.01)

(52) U.S. Cl. .......................................... 348/53; 348/51

(58) Field of Classification Search ............... 348/42–60
See application file for complete search history.

(56) References Cited

U.S. PATENT DOCUMENTS

| | | | | |
|---|---|---|---|---|
| 5,239,373 A * | 8/1993 | Tang et al. | ............... | 348/14.01 |
| 5,502,481 A * | 3/1996 | Dentinger et al. | ............. | 348/51 |
| 5,606,363 A * | 2/1997 | Songer | ............................ | 348/49 |
| 5,781,229 A * | 7/1998 | Zediker et al. | .................. | 348/51 |
| 5,822,117 A * | 10/1998 | Kleinberger et al. | ......... | 359/465 |
| 6,002,518 A * | 12/1999 | Faris | ............................. | 359/465 |
| 6,163,336 A * | 12/2000 | Richards | ....................... | 348/42 |
| 6,188,442 B1 * | 2/2001 | Narayanaswami | ........... | 348/564 |
| 6,211,927 B1 * | 4/2001 | Yamazaki et al. | ............. | 349/15 |

* cited by examiner

*Primary Examiner* — Andy Rao (74) *Attorney, Agent, or Firm* — K. David Crockett, Esq.; Paul J. Backofen, Esq.; Crockett & Crockett, PC (57) ABSTRACT

The multi-person stereo display system permits several independent viewers to see different stereo images on a single projection surface. This is accomplished through the innovative use of video multiplexing, software, control electronics, and special viewing glasses. The system is particularly useful in situations where the viewers see computer generated images from their own independent perspectives.

1 Claim, 8 Drawing Sheets

MULTI-PERSON STEREO DISPLAY SYSTEM

This application is a continuation of U.S. application Ser. No. 11/196,010 filed Aug. 2, 2005 now abandoned, which is a continuation of U.S. application Ser. No. 10/392,481 filed Mar. 18, 2003, now U.S. Pat. No. 6,924,833 which is a continuation of U.S. application Ser. No. 08/748,595 filed Nov. 13, 1996, now U.S. Pat. No. 6,535,241.

FIELD OF THE INVENTIONS

This invention relates to the field of multi-person stereo display systems incorporating head-tracking for immersive environments in virtual reality systems.

BACKGROUND OF THE INVENTIONS

Many people have developed large immersive displays based on rear projection techniques. These systems generally incorporate a projection screen or multiple projection screens in large CRT-based projectors which project images from a computer onto the screen. The user or users generally wear flicker stereo glasses and see images on the projection screens. The images on the projection screens are refreshed at 120 hertz (or some other higher than normal vertical rate) and the flicker glasses provide the user with different images to each eye by changing the opacity of the lens in front of each eye in sync with the accelerated vertical refresh of the monitor.

These systems vary in their configuration and may have between 1 and 6 projection screens in a single system. In multi-screen configurations the viewer may stand either in a corner at the junction between 2 screens or in a room composed of several projection screens with images projected onto the walls, floor and possibly even the ceiling. Each screen has an image projected on it by a projector which is oriented behind the screen—possibly with an intervening mirror—which relays the image and shortens the image path or folds in a convenient way. In single screen systems, the screen is either oriented at an angle relative to the viewer, much like a drafting table, or it may be oriented in a horizontal orientation so that it more closely resembles a table surface.

Some researchers, such as NRL have been doing similar work with non head-tracked interfaces. In these settings, the viewer or viewers all see a stereo pair and for the best view should stand in a small cluster near the place where the perspective is calculated from in the software.

These systems have been demonstrated on a number of occasions. One of the early public demonstrations was presented by Michael Deering of Sun Microsystems at Siggraph 1992. The Virtual Portal system incorporated three walls which were projection screens, each of which was approximately 10'.times.10' and surrounded the user who wore stereo glasses and a head-tracker. The head-tracker is used so that the computer can update the images appropriately as the user moves around. For example, if there is a cube in front of the user on the projection screen, as the user moves around the images are updated in such way that the user may look at different sides of the cube by moving their head or walking around it.

In addition to large systems such as this, Michael Deering has also developed systems which are based on a flat, small monitor display as would typically accompany a workstation. Again, head-tracking is used so that the stereo images presented on the display give an illusion of an object floating in front of the user. The user can generally interact with these objects by use of a hand-tracker of some kind of a tracked wand. The tracking technology for these systems is generally either electromagnetic in nature or acoustic. Michael Deering, in particular, has generally used acoustic tracking for various reasons.

Other researchers have used magnetic tracking. An example of this would be the systems that have been developed by the University of Illinois at Chicago (Electronic Visualization Lab) which were demonstrated at Siggraph 1993. These systems use an electromagnetic tracker to track the location of a person in a room composed of a number of large screens. The advantage of electromagnetic tracking is that there are no "line-of-sight" requirements for the tracking technology to function correctly.

These systems generally have one person who wears both the stereo glasses which are standard flicker glasses for stereo at 120 hertz (approx. per eye) and the computer updates the perspective views for left and right eyes according to the location of this individual person. Thus, other people who are also wearing the stereo glasses will see a stereo image but it is offset because the images are being calculated from the head-tracked point of view rather than from their own point of view.

Consider the cube example: if there is a virtual cube and person A is standing on one side of the cube with the head-tracker and another person B is actually standing on the other side of the cube, both people in fact see the same image because only one view is presented and it is from the point of view of person A who has the head-tracker. The person B without the head-tracker sees an incorrect view. For person B to get a correct view, the tracker would have to be passed over to person B and the image calculated from B's point of view. Of course, then A is getting the wrong view which is not ideal. In general, when using these systems there has been the restriction that users who are passively viewing the system must stand close to the person with the head-tracker in order to get an incorrect but sort of acceptable perspective.

In a multi-screen projection environment, this limits the number of people who get a reasonable view to just a couple of people and also restricts the mobility of those who all must stay as a small group inside the room. This means that things like collaborative computing and collaborative design are difficult because one person is essentially in control of what everybody sees. In other systems, this is also an issue. For example, the responsive workbench, originally developed at GMD in Germany, is a flat table-top display and again head-tracking with stereo glasses is used so that one may see a stereo image on the table. If multiple people are looking at the table together, only those people who are very close to the person with the head-tracker see a reasonable view and as this person moves around, the passive viewer's perspectives are very distorted. This is particularly objectionable in situations such as training and situation awareness or planning. In a training exercise, a surgeon may be attempting to illustrate a procedure to a student and the student would like to be able to see the procedure from the correct perspective from their point of view. The surgeon also needs to be able to see the operation proceeding correctly from her own point of view and it is unacceptable for the view of either person to be incorrect.

Thus, in all present systems, a single viewer has both the head-tracker and the stereo glasses and this person essentially controls the view that all other participants will see. We have developed a system which eliminates this restriction and simultaneously provides the correct perspective to more than one person. This is a tremendous step forward for presenting a virtual environment in a large projection-type display to more than one person at a time which is very important for collaborative computing and collaborative design.

SUMMARY

The invention is a system which includes software, video muxing, control, and special flicker glasses. The system is currently controlled by a personal computer (PC) which may be easily replaced by a micro controller, or other electronics.

The invention is described in terms of two independent viewpoints into the computer generated scene. In general the same basic scheme may be extended to N viewers. The invention is framed in the context of CRT based projectors which have 3 lenses (Red, Green, and Blue). The technology of projection displays is a rapidly evolving field and the use of LCD or DMD projectors may offer some alternate configurations which are advantageous. In particular, we expect that a DMD projector would work well and allow one to support a large number of viewers.

DESCRIPTION OF THE REFERENCE NUMERALS IN THE FIGURES

| Number | Description |
|---|---|
| 100 | Computer |
| 105 | Projector |
| 110 | Mirror |
| 120 | Rear projection screen |
| 130 | Tracker source |
| 140 | Tracker receiver |
| 150 | Stereo glasses |
| 160 | User with head tracker 140 and Stereo glasses |
| 161 | User with stereo glasses |
| 162 | User with stereo glasses |
| 163 | User with stereo glasses |
| 170 | User's left eye view (all viewers see the same left image) |
| 180 | User's right eye view (all viewers see the same right image) |
| 190 | Glasses controller |
| 210 | Left screen |
| 220 | Center screen |
| 230 | Right screen |
| 240 | User |
| 250 | Left projector |
| 260 | Center projector |
| 270 | Right projector |
| 300 | Silicon Graphics frame buffer |
| 301 | Area where Person A left eye view is drawn |
| 302 | Area where Person A right eye view is drawn |
| 303 | Area where Person B left eye view is drawn |
| 304 | Area where Person B right eye view is drawn |
| 305 | Alternate frame buffer configuration |
| 310 | Video 2:1 mud |
| 320 | Projector |
| 330 | Projection surface, possibly incorporating mirrors |
| 340 | StereoGraphics GDC3 |
| 350 | Personal computer parallel port interface |
| 360 | Personal computer |
| 370 | Shutter driver electronics |
| 371 | Shutter driver electronics |
| 372 | Shutter driver electronics |
| 373 | Shutter driver electronics |
| 375 | Filter (typical) |
| 380 | Person A glasses |
| 381 | Left eye shutter |
| 382 | Right eye shutter |
| 390 | Person B glasses |
| 391 | Left eye shutter |
| 392 | Right eye shutter |
| 401 | Frame buffer Person A |
| 402 | Frame buffer Person B |
| 403 | Projector A |
| 404 | Projector B |
| 405 | A, B, C Electronically controlled optical shutter(s) for projector A |
| 410 | A, B, C Electronically controlled optical shutter(s) for projector B |
| 420 | Immersive workbench screen system |
| 430 | Glasses Person A |
| 440 | Glasses Person B |
| 450 | Personal computer and control software |
| 460 | Parallel port interface |
| 470 | Shutter drive electronics |
| 480 | Shutter drive electronics |
| 490 | Dual-channel shutter drive electronics for glasses of person A |
| 495 | Dual-channel shutter drive electronics for glasses of person B |
| 500 | Time starting for a single sequence |
| 505 | Shutter for Projector A on and Person A left glasses on |
| 510 | Projector A still on, glasses A right on |
| 520 | Shutters for Projector A turning off, glasses A right turn off |
| 530 | Projector B on, and glasses Person B left on |
| 540 | Projector B still on, glasses Person B right on |
| 550 | Projector B shutters turning off, Person B right shutter turning off |
| 560 | End of cycle |
| 591 | State for shutter(s) in front of lens(s) of Projector A, high = on |
| 592 | State for shutter(s) in front of lens(s) of Projector B, high = on |
| 593 | Glasses, shutter Person A left eye |
| 594 | Glasses, shutter Person A right eye |
| 595 | Glasses, shutters Person B left eye |
| 596 | Glasses, shutters Person B right eye |
| 600 | Start of sequence |
| 601 | Transition from A to B |
| 602 | B active |
| 603 | Transition from B to A |
| 610 | Transition from B to A ends |
| 611 | Projector A turning off |
| 612 | Projector B on |
| 613 | Projector B turning off |
| 614 | A on |
| 700 | Start of sequence |
| 705 | Projector A shutters turned on, glasses A left on |
| 710 | Projector A shutters still on, glasses A switch to right on, left off |
| 720 | Projector A shutters transitions on to off, Projector B transitions off to on both glasses off |
| 730 | Projector B shutters on, glasses B left on |

-continued

| Number | Description |
|---|---|
| 740 | Projector B still on, glasses B switch to right on |
| 750 | end of sequence |
| 791 | State for shutter(s) in front of lens(s) of Projector A, high = on |
| 792 | State for shutter(s) in front of lens(s) of Projector B, high = on |
| 793 | Glasses, shutter Person A left eye |
| 794 | Glasses, shutter Person A right eye |
| 795 | Glasses, shutters Person B left eye |
| 796 | Glasses, shutters Person B right eye |
| 800 | Start of sequence |
| 801 | State for shutter(s) in front of lens(s) of Projector A, high = on |
| 802 | State for shutter(s) in front of lens(s) of Projector B, high = on |
| 803 | State for shutter(s) in front of lens(s) of Projector C, high = on |
| 804 | State for shutter(s) in front of lens(s) of Projector D, high = on |
| 810 | Projector A on and Glasses A Left on |
| 811 | Glasses, shutter Person A left eye |
| 812 | Glasses, shutter Person A right eye |
| 820 | Projector A on and Glasses A Right on |
| 821 | Glasses, shutters Person B left eye |
| 822 | Glasses, shutters Person B right eye |
| 830 | Transition Projector to Projector B all glasses off |
| 831 | Glasses, shutter Person C left eye |
| 832 | Glasses, shutter Person C right eye |
| 840 | Projector B on and Glasses B Left on |
| 841 | Glasses, shutters Person D left eye |
| 842 | Glasses, shutters Person D right eye |
| 850 | Projector B on and Glasses B Right on |
| 860 | Projector C on and Glasses C Left on |
| 870 | Projector C on and Glasses C Right on |
| 880 | Transition Projector to Projector B all glasses off |
| 890 | Projector D on and Glasses D Left on |
| 895 | Projector D on and Glasses D Right on |

DETAILED DESCRIPTION OF THE INVENTIONS

Figure 1:
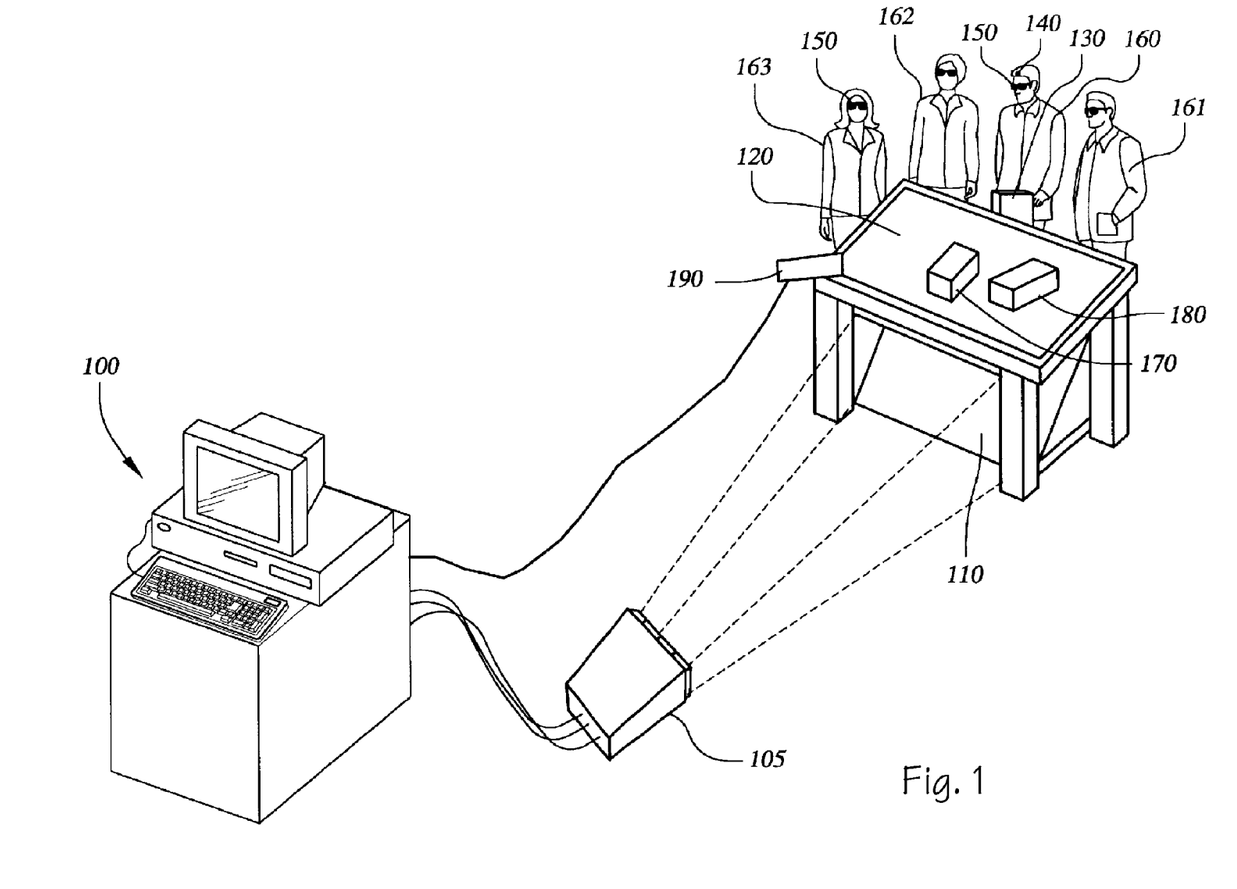
FIG. 1 shows a typical, basic one correct view system incorporating a computer and projector on a tabletop display.

FIG. 1 illustrates the basic system for the single correct viewer case. In this system, a computer (100) generates an image based on the position and orientation of the viewer (160) who's head motions are detected by the head tracker which is composed of source (130), and sensor (140). The data from the tracker is relayed to the computer (100) and this position and orientation data is used to compute the correct left and right eye perspective views from the person's point of view. These images are generated by the computer and relayed to the projector (105). The images from the projector go through mirror (110) and appear on the display surface (120). The viewer 160 sees different images in the left and right eyes through the glasses (150). The right/left opening of the glasses is controlled by controller (190) which is often infrared but might need a wire to the glasses. As previously described, these glasses flicker in time to an infrared beacon (190) which is also controlled by the computer (100). The person (160) sees the images (170) and (180) in their left and right eyes, respectively, thus giving the illusion of a model (in this case a cube) being on/in/above the table. As the person (160) moves their head, these images are updated by the computer and the illusion is maintained. Viewers 161, 162, and 163 also see the same stereo pair on the table as person 160. The view from their perspective is incorrect however. For example, person 163 should see a different face of the cube than will person 160. However, the current state of the art does not permit this. Instead the same view as person 160 is seen. For viewers 161 and 162 there is an error but if they stand very close to person 160 they will see an OK image pair.

Figure 2:
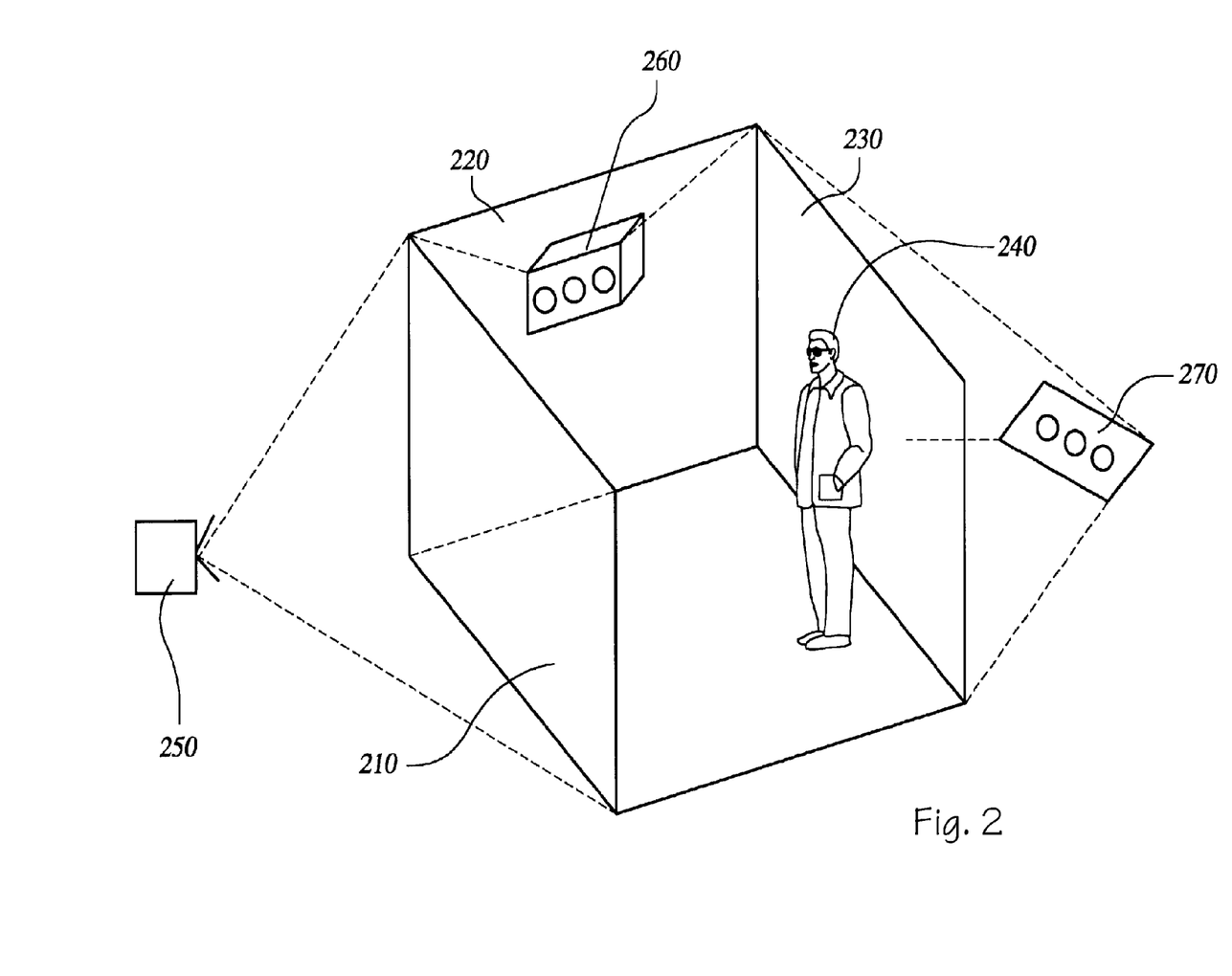
FIG. 2 shows a multi-screen, rear projection system as is typical with a single, active viewer.

FIG. 2 illustrates a multi-screen system in which the viewer stands surrounded by three large screens. Again, the images on the three screens are presented in stereo. The image on the left screen (210) is projected onto the screen by projector (250). The image on the center screen (220) is projected by projector (260), and the image on the right screen (230) is projected by projector (270). The viewer (240) is head tracked and can look around in this space and see a stereo image on all three screens simultaneously. Thus, there is an illusion of being "in" a space. Of course, this is true only for this single viewer (240). If another viewer were to step into the room and was to be in an opposite corner, for instance, the view would not be correct.

Figure 3:
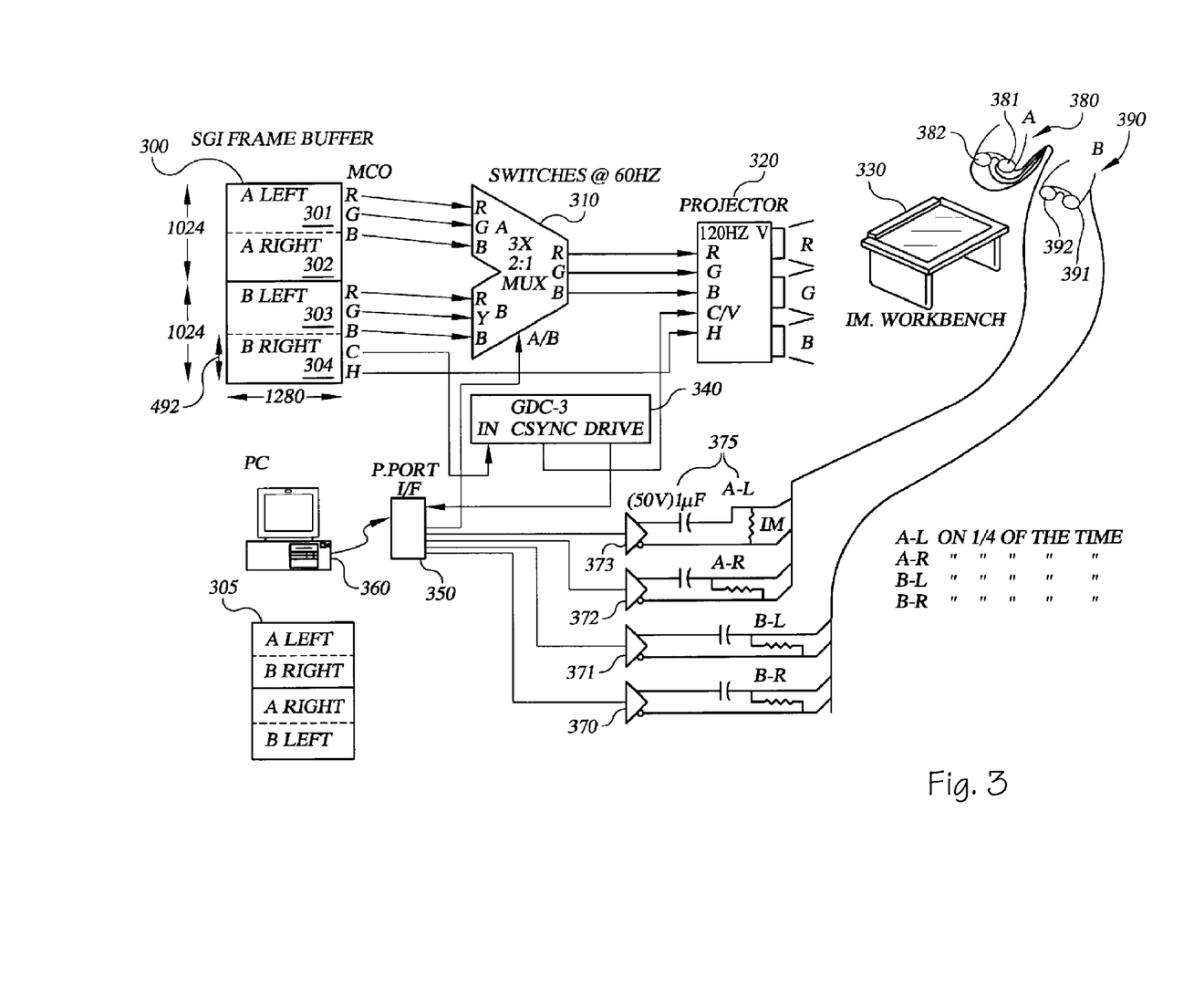
FIG. 3 illustrates the basic system diagram for two people with a single projector and a single computer with a frame buffer and a multi-channel option.

FIG. 3 illustrates the system diagram for two people, both seeing stereo images, in a system which incorporates a single projector. The images that the two people see are generated by a Silicon Graphics machine. The images generated by the computer are stored in a frame buffer. In this case, the frame buffer is organized as shown by (300). The frame buffer is essentially 2,048 pixels tall and 1,280 pixels wide. This buffer is divided into four areas for the left and right eyes of each of the two participants. In frame buffer (300), area (301) is used by the left eye of Person A, and area (302) is used by the right eye of Person A. Area (303) is used by the left eye of Person B and area (304) is used by the right eye of Person B. The video data from these areas comes out over 6 cables (RGB per eye). Three of the cables come out of the frame buffer for Person A and three of them for Person B. This is an SGI with a multi-channel option in the 2@1280.times.1024.sub.—60 mode. In addition to the configuration shown, alternate configurations as shown in (305) are also possible with simple software changes on the SGI and the PC which controls the glasses. The images from the frame buffer are taken into a 2:1 mux (310). This video mux can switch between input "A" and input "B" and produces a single video signal over the three cables which go to the projector (320). Thus, by controlling the state of mux (310), one may switch between Person "A" and Person "B." The image from projector (320) passes to a display surface (330). In getting onto the projection surface the image may be bounced through a mirror in order to fold the optical path for convenience. In addition to the projector receiving the video imagery from the mux (310), a GDC3 controller is used to generate the vertical sync information. This unit takes in composite sync from one of the two video channels and produces a sync signal with an added vertical sync signal in the middle of the image for the projector. In addition, it produces a signal which switches at 60 hertz. This signal is fed to the parallel port interface (350) of personal computer (360). The state of the signal from the GDC3 is used by the PC to determine which eye should be unveiled. In addition, this signal is used as a reference for keeping the personal computer synchronized to the vertical sync of the images coming into the system from the Silicon Graphics computer. The sync from the GDC3, which is running at 120 hertz, goes to the projector (320). The parallel port interface (350) interfaces between the personal computer (360) and the rest of the system. The drive signal from the GEC3 comes into the parallel port and causes an interrupt on the PC which indicates that a frame is starting. This interrupt is triggered by the edge of the drive signal rather than the logic level. The software on the PC controls the state of the mux (310), and also the state of the shutters in the glasses (381, 382, 391, 392). Between the parallel port interface (350) and the glasses there are some drive electronic units (370,371,372,373). The parallel port output to the glasses goes through a buffer and this buffer provides enough energy to drive the shutters to the desired state. Because the drive wave form for the shutters will be asymmetric, a filter is used to AC couple the shutters from the drive electronics. For example, the drive electronics (373) interfaces between the parallel port interface (350) and the glasses (380) in particular, one of the two lenses (382 or 381) and between the driver and the glasses one will see the filter (375) which is composed of a capacitor and a resister which AC couple the signal between the driver and the shutter so that the shutter is not damaged. Similarly, the other lenses are driven by a similar filter network and drive electronics (372, 371, 370).

The PC 360 is used as a central controller for the various timing requirements. The PC uses its parallel port to interface to the system and to control the timing. Various bits on the parallel port control which of the four eyes is "open" and the state of the 2:1 mux. The GDC-3 DRIVE output is connected to pin 10 of the parallel port which is an input to the PC. In this way, the PC determines which eye should be shown. In addition, the PC determines the state of the 2:1 mux thus determining which video image will be routed to the projector during this frame time.

The PC 360 controls which eye and which person is being displayed; it can turn on the respective shutters for making that view visible to the correct eye. It does this by outputting the correct bit on the parallel port interface for turning the correct shutter on. The shutters are actually driven by the shutter drivers (373) and the intervening filter (375) and so the PC just outputs a high-level to indicate that the glasses for that person should be used and the high is routed either to the left eye or the right eye interface. Thus, person A has a stereo pair. Each eye saw an image for $\frac{1}{125}$th of a second and the entire process took $\frac{1}{60}$th of a second. The PC now switches the mux over to position B and the mux is left there for $\frac{1}{60}$th of a second which is long enough for a full video image (1280.times.1024) to get routed to the projector. In the midst of this frame, of course, the GDC3 again inserts an additional vertical sync pulse and switches the drive signal again and this occurs at the half-way point so two images of 1280 horizontal by 492 vertical will be displayed by the projector on the immersive work bench. The PC gets the same information as before, but as the mux is in position B, routes the control signals for the glasses over to the glasses belonging to person B by controlling the drivers (371 and 370). That essentially concludes the rendering of a single frame for both people. Each person saw an image in each of their eyes for $\frac{1}{120}$th of second, i.e., $\frac{1}{60}$th of a second each, so, overall, the update rate is 30 hertz because each person gets $\frac{1}{60}$th and two 60th's is $\frac{1}{30}$th.

We move now to an alternate configuration which permits one to reach display rates which are higher than 30 hertz stereo which is a little flickery.

Figure 4:
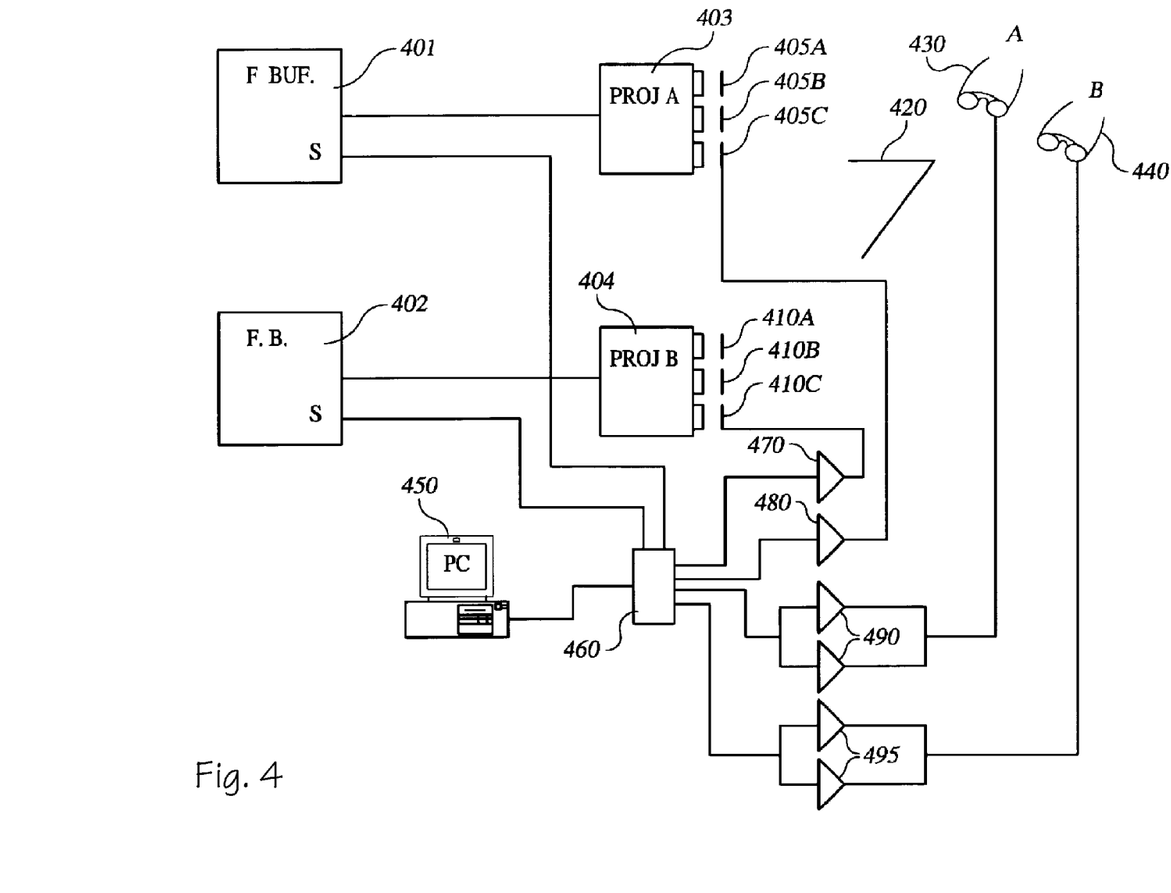
FIG. 4 shows the configuration for high frame rate multi-person stereo using two people as an example configuration.

FIG. 4 shows a projector and glasses configuration which enables high-resolution multi-person stereo with high frame rates. This system is composed of two frame buffers or other video sources which generally would come from a computer such as a Silicon Graphics Reality Engine or some other type of graphics workstation or personal computer. These are represented by the areas shown as 401 and 402. These frame buffers are connected to two independent projectors. Frame buffer (401) is connected to projector (403). This projector will display the image from frame buffer (401) on the display surface (420). The projector is mounted so that the image appears on the projection surface after passing through the shutters (405A, 405B, and 405C). These shutters could be configured as a single panel; current off the shelf shutters are available up to approximately 4" in diameter.

Frame buffer (402) is interfaced to projector (404) whose image passes through shutters (410A, B, and C) on its way to display (420). The images from the frame buffers (401 and 402) displayed by the projectors on the display surface may be driven in stereo from each of the frame buffers so that the projectors are running at a vertical frequency higher than normal and displaying alternate frames of left and right eye imagery. The images from the two projectors are aligned onto the display surface (420) and when the system is in operation, the person A looking through glasses (430) will only be able to see the image from projector A and the person using glasses (440) will only be able to see the image from projector (404). In practice, there will be some bleed-through of both the glasses and the shutters so that the images seen by each person will also include some slight visual "shadows" where the other image is being displayed. This may be improved by improving the contrast ratio of the various optical shutters and by improving the off-axis performance of the various shutters and the performance of the projectors. The sync signal from each of the frame buffers is fed to a personal computer which monitors the position of each projector relative to the top of the picture by counting A sync and B sync as required. In fact, the PC may easily be replaced by a custom controller, or a microcomputer, or processor of some kind. In this system, the personal computer (450) controls the state of the various shutters through parallel port interface (460). This interface allows the personal computer to control the shutters for projector A (405 A, B, and C) which are driven by driver (480). The images from projector B also pass through shutters (410 A, B, and C). These shutters are controlled by the PC through the parallel port interface and driver (470). The PC also controls the state of each of the lenses in the glasses (430 and 440). This is done by the drive circuitry (490 and 495). In operation, the shutters for projector A and projector B are driven at a fast rate so that the images coming from the projectors are simultaneously displayed on the immersive workbench from an external point of view. So, if you were to look at the table without the glasses on you would see both the left and right eye images from both frame buffer A and frame buffer B on the table. The shutters in front of each projector are turning on and off very quickly (>100 Hz) in order to modulate the light coming from the projector and hitting the table. They are modulating the light in a Ping-Pong fashion so that any instant in time, only one of the two images will actually be on the table. The shutters are thus being driven much quicker than the vertical frequency of the two projectors. This frequency is somewhat adjustable. It is obviously impractical for this to be less than 30 hertz because otherwise one might as well use the configuration shown in FIG. 3 which uses only one projector instead of two. Of course, if one had a special projector which could show images at a very high rate, then one could eliminate the shutters 405ABC and 410ABC. The rest of the design would stay essentially the same.

Figure 5:
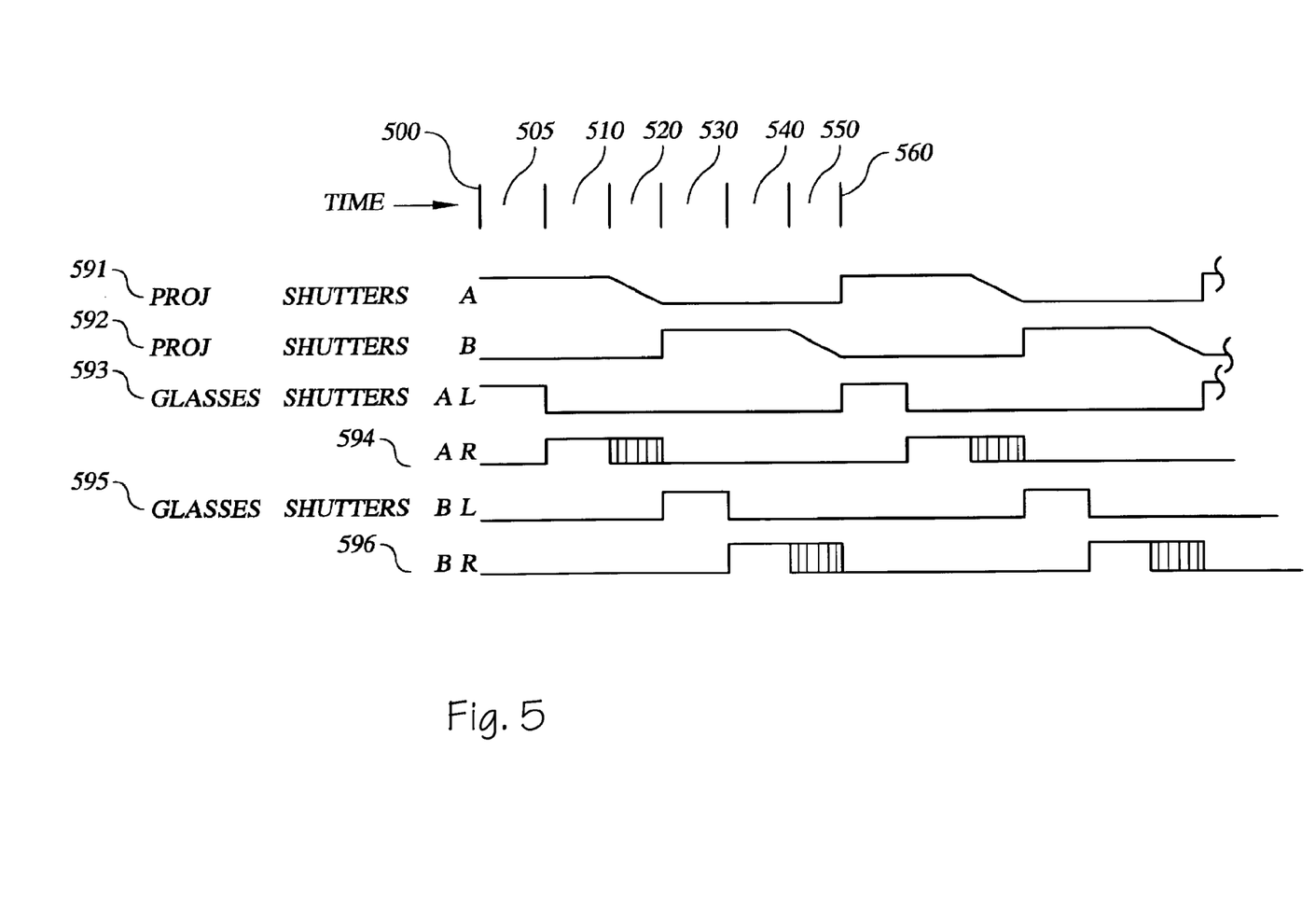
FIG. 5 illustrates the sequence for the shutters in FIG. 4 with the shutters for each projector as a single row in the table and assuming the shutters for the projectors have a fast on time, but a slow transition from on to off.

FIG. 5 shows the various states of the shutters in the system shown in FIG. 4 over time. The first cycle of the sequence is for person A to see the left and right eye images which are appropriate. Following this, the second person, Person B, sees the left and right eye images from their respective points of view. This is accomplished in the following manner. Time in the figures runs from left to right. In this figure, time "starts" at the transition from opaque to clear of the shutters in front of projector A. This start of the sequence is shown by the marker (500). Time in the figure runs to the right and the state of the various shutters is indicated by the line to the right of the name of the shutter and the following shutters are shown: 591 indicates the shutters that are located in front of the projection lenses for the projector corresponding to person A. 592 is representative of the shutters which are positioned in front of the lenses of projector B. 593 represents the state of the shutters in front of the person A over their left eye. 594 is for the shutter over Person A's right eye. 595 is over Person B's left eye, and 596 is over Person B's right eye. The exact ordering of the states for shutters 593 through 596 is actually dependent upon which eye image is drawn in the frame buffer is what position; thus, if one were to draw the images differently in the frame buffers, one would need to adjust the timing of the shutters accordingly. This particular configuration was chosen somewhat arbitrarily. As time progresses, the states of the shutters are changed by the controller and the state of each shutter is indicated by the line and a high state indicates that the shutter is clear. A low state indicates that that shutter is opaque. The transitions from clear to opaque, or opaque to clear, are not instantaneous, in general, and take some time. In fact, shutters may be designed which have unbalanced transitions as shown in this diagram where for the shutters in front of the projectors, the transition from opaque to clear is very quick, and the transition from clear to opaque is somewhat slower. The system which we have constructed uses a different shutter material for the glasses than it does for the projectors. The shutter material for the glasses can be manufactured only in small shutters which are too small for use directly in front of the lenses for a projector. However, it is possible in the future that this size limitation will be lifted, in which case the transition time for both shutters over the projector and those over the glasses would be more instantaneous and this would simplify the system's design and increase the overall efficiency. As time progresses from the start of the cycle at 500 to 505, the shutter in front of the projector for person A (591) is clear and the image from the projector will reach the display screen. Also during this time, the shutter in front of person A's left eye shutter (593) is also turned on and the person's left eye will see the image from projector A. In the next instant (510), the shutter for projector A is still on so 591, as you can see, is still high, 593 is turned off, and the person's left eye can now no longer see the display and the shutter for the person's right eye (594) has been turned on and can now see the display. At this point in time, of course, it is expected that the image from the frame buffer which person's right eye should be seeing, is being fed to the display to the projector. In the next instant (520), the shutters for the projector A are being turned off and this transition occurs over a small time period and somewhere during this time period the glasses for person A should be completely turned off, as shown in the figure. Thus, at the end of time period (520), the projector A shutters are completely off, as are both left and right eye shutters for person A. In the next instant (530), projector shutters (592) are turned on, thus allowing light from projector B to flow to the display. The shutters for the glasses A are left off and the shutters for the B person are adjusted. In the first instant, shutter (595) is turned on and person B's left eye sees the left eye image. At the end of this instant the shutter for the person B's left eye (595) is turned off and in the next instant (540), the glasses for person B will switch over to the right eye so that shutter (596) is on and (595) is off. The shutter for the projector B (592) is left on. During instant (550), the shutters for projector B are turned off and at some point during this interval the shutter for person B's right eye (596) is also turned off. Thus, at the end of time period 50, we are now back at the same point as we were at the beginning of the figure and starting at 560, the sequence which started originally at 500 would be repeated ad infinitum. This sequence can be repeated as quickly as it is possible to switch the shutters with reasonable losses. As you can well imagine, the transition time of the projector shutters, shown here in time period 520, and 550, will become the dominant period as the frequency of repetition is increased. These transition times limit the maximum possible efficiency of the system.

Figure 6:
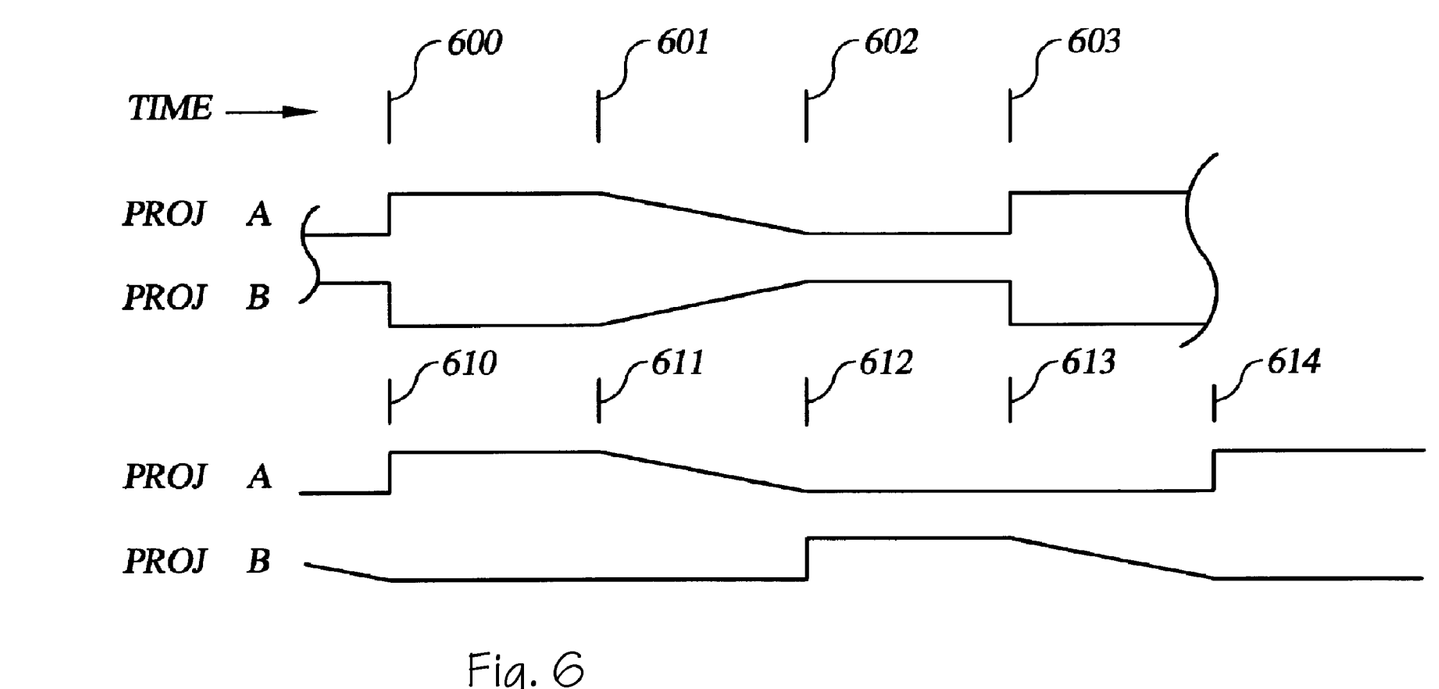
FIG. 6 shows a technique for increasing the efficiency of the system under the condition that the on and off times for the shutters is asymmetric.

FIG. 6 illustrates a significant efficiency improvement over FIG. 5. As mentioned in reference to FIG. 5, the switching time of the shutters for the projectors heavily influences the achievable efficiency of the system as shown. In order to increase the efficiency of the system, we can take advantage of the fact that the shutters in front of the projectors are asymmetric and that this asymmetry in turn on/turn off time may be set up so that it either happens on the on to off transition or on the off to on transition. But setting up the projectors with projector A having a fast on time and a slow off time and projector B having a fast off time and a slow on time, we can improve the overall efficiency of the system, as shown in FIG. 6.

At time (600), projector A turns on and projector B turns off. This occurs fairly quickly and projector A is left on and projector B is left off until time (601). At time (601), the transition for project A is begun as is the transition for projector B. By the end of this time period at (602), projector B is now on and projector A is now off. This time is duly used for the transition of both projectors resulting in an efficiency. At the end of time period (603), we again switch which projector is on, and, as both shutters are in the state from which they can switch quickly, this transition is fairly fast. The configuration shown in FIG. 5 results in the following sequence, which, as you can see, takes longer. Projector A and B use the same type of shutter which has a fast on time and a slow off time. At instant (610) projector A is turned on as B has turned completely off. At (611), we start the transition for projector A from on to off, and at (612), projector B is turned fully on now that projector A is fully off. At (613), we begin the transition for projector B turning off and at (614), we again turn projector A back on again. As you can see, this sequence takes longer than the sequence where the asymmetric shutter turn on, turn off curves have been used to our advantage.

Figure 7:
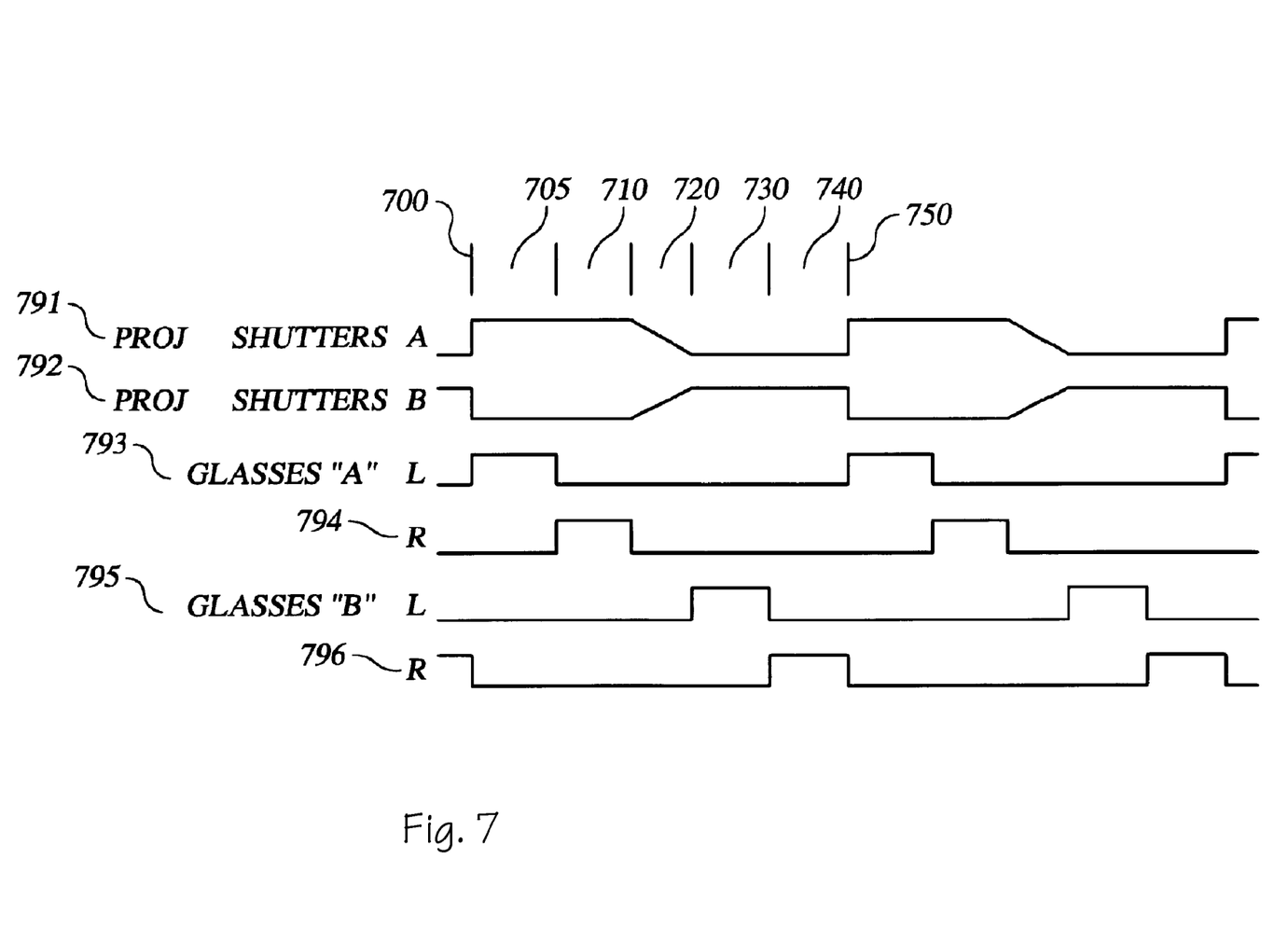
FIG. 7 shows the technique of FIG. 6 and the timing of the glasses relative to the projector shutters.

FIG. 7 illustrates the combination of the increased efficiency as described in FIG. 6 with the states of the glasses for the two viewers. 791 is the state of the shutters in front of Projector A. 792 is the state of the shutters in front of Projector B. 793 and 794 are the states of the left and right shutters in the glasses for person A. 795 and 796 are the states of the shutters for the left and right eyes of person B. Time starts at mark 700 and proceeds right to left to 750 at which point the sequence is repeated. In time 705, The left view from projector A is seen. In duration 710 the right view for person A is seen. In duration 720 the transition from projector A to projector B is made and all glasses are off. In duration 730 the left eye view of B is seen. In duration 740 the right eye view of B is seen. As you can see, there is a lot less "dead" time in this figure than in FIG. 5 by overlapping the transitions of the projector shutters, a more efficient system is achieved.

Figure 8:
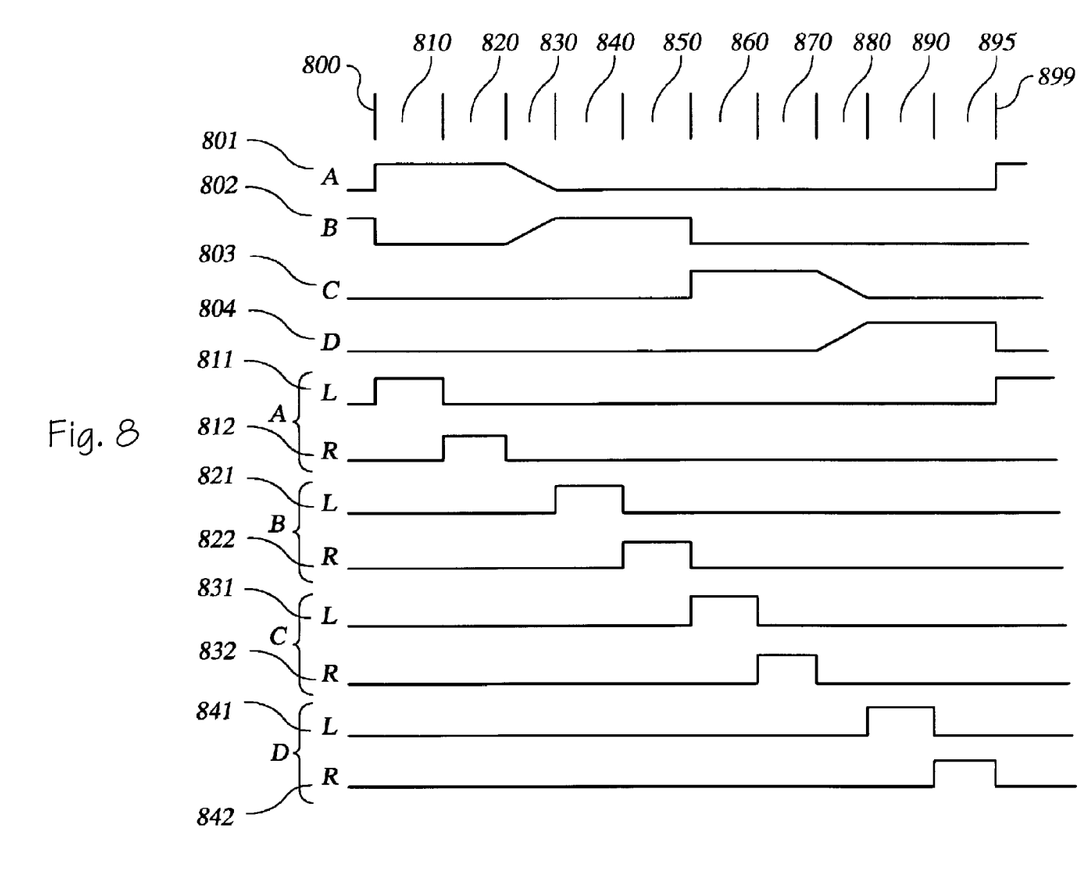
FIG. 8 shows the timing for a system with four viewers rather than two.

FIG. 8 illustrates the system timing with four independent viewers using four projectors. The projectors are continuously projecting sequential stereo images and shutters between the projectors and the display surface determine which of the four projectors is illuminating the screen at any instant in time. Time in the figure starts at 800 and runs to the right. During time 810 projector A 801 is enabled and the left eye 811 of the A glasses is on. During time 820 projector A 801 is enabled and the right eye 812 of the A glasses is on. During time 830 the transition is made from projector A 801 to projector B 802. During time 840 projector B 802 is enabled and the left eye 821 of the B glasses is on. During time 850 projector B 802 is enabled and the right eye 822 of the B glasses is on. During time 860 projector C 803 is enabled and the left eye 831 of the C glasses is on. During time 870 projector C 803 is enabled and the right eye 832 of the C glasses is on. During time 880 the transition is made from projector C 803 to projector D 804. During time 890 projector D 804 is enabled and the left eye 841 of the D glasses is on. During time 895 projector D 804 is enabled and the right eye 842 of the D glasses is on. Thus at time 899 we are back at the start of the sequence. Four independent stereo views have been presented to four independent viewers.

We claim:

1. A stereoscopic display system comprising:
   at least one projector, each of the at least one projectors having a shutter;
   a first pair of stereoscopic shutter glasses for use by a first viewer;
   a second pair of stereoscopic shutter glasses for use by a second viewer;
   a computer programmed to generate a first set of images and a second set of images, the first set of images being generated to correspond to the position of the first viewer, the second set of images being generated to correspond to the position of the second viewer, the first and second set of images to be projected by the projector, and
   a controlling unit which controls the optical transparency of shutters for the at least one projector, the first pair of glasses and the second pair of glasses; said controlling unit operating in conjunction with the computer to control each projector shutter, the first pair of glasses and the second pair of glasses so that the first pair of glasses is stereoscopically transparent when the first set of images is projected, and the second pair of glasses is stereoscopically transparent when the second set of images is projected.

* * * * *